(12) United States Patent
Branscomb et al.

(10) Patent No.: US 10,887,211 B2
(45) Date of Patent: Jan. 5, 2021

(54) INDIRECT PACKET CLASSIFICATION TIMESTAMPING SYSTEM AND METHOD

(71) Applicant: Microsemi Storage Solutions, Inc., Aliso Viejo, CA (US)

(72) Inventors: Brian Branscomb, Hopkinton, MA (US); Lars Ellegaard, Copenhagen (DK); Kristian Ehlers, Skovlunde (DK); Thomas Joergensen, Soeborg (DK)

(73) Assignee: Microsemi Storage Solutions, Inc., Chandler, AZ (US)

( * ) Notice: Subject to any disclaimer, the term of this patent is extended or adjusted under 35 U.S.C. 154(b) by 217 days.

(21) Appl. No.: 16/109,898

(22) Filed: Aug. 23, 2018

(65) Prior Publication Data
US 2019/0089615 A1    Mar. 21, 2019

Related U.S. Application Data

(60) Provisional application No. 62/559,648, filed on Sep. 18, 2017.

(51) Int. Cl.
*H04L 12/26*    (2006.01)
*H04J 3/06*    (2006.01)
(Continued)

(52) U.S. Cl.
CPC .......... *H04L 43/106* (2013.01); *H04J 3/0673* (2013.01); *H04J 3/0697* (2013.01);
(Continued)

(58) Field of Classification Search
None
See application file for complete search history.

(56) References Cited

U.S. PATENT DOCUMENTS 8,571,014 B2    10/2013    Joergensen et al.
9,450,846 B1    9/2016    Huang et al.
(Continued)

FOREIGN PATENT DOCUMENTS

EP    2381622 A1 *    10/2011    ......... H04L 43/0858
EP    2381622 A1    10/2011
(Continued)

OTHER PUBLICATIONS

"BCM56440 With Fully Integrated Timing Solution for Network Operators" White Paper, Broadcom Corporation, 5300 California Avenue, Irvine, CA 92617, May 2011.
(Continued)

*Primary Examiner* — Ayaz R Sheikh
*Assistant Examiner* — Tarell A Hampton
(74) *Attorney, Agent, or Firm* — Glass and Associates; Kenneth Glass (57) ABSTRACT

A PHY constituted of: a clock arranged to generate a time signal indicative of the current time; and an egress stamp functionality arranged to: receive a data packet on the egress side, extract data from a predetermined section of the received data packet, and responsive to the extracted data, perform one of a plurality of predetermined timestamp operations, the plurality of predetermined timestamp operations comprising: generating a timestamp signal responsive to the generated time signal; not generating a timestamp signal; or modifying a timestamp written in the received data packet.

10 Claims, 6 Drawing Sheets

(51) Int. Cl.
    *H04L 29/06* (2006.01)
    *H04L 29/08* (2006.01)
(52) U.S. Cl.
    CPC ............ *H04L 43/028* (2013.01); *H04L 43/04* (2013.01); *H04L 69/22* (2013.01); *H04L 69/28* (2013.01); *H04L 69/323* (2013.01); *H04J 3/0667* (2013.01)

(56) References Cited

U.S. PATENT DOCUMENTS

| | | | | |
|---|---|---|---|---|
| 2003/0115480 | A1* | 6/2003 | McDysan | H04L 63/0272 726/36 |
| 2004/0143701 | A1* | 7/2004 | Giambalvo | G11C 15/00 711/108 |
| 2006/0034233 | A1* | 2/2006 | Strutt | H04W 28/06 370/338 |
| 2007/0073824 | A1* | 3/2007 | Choo | H04L 61/2038 709/208 |
| 2009/0190613 | A1 | 7/2009 | Finn | |
| 2011/0051754 | A1* | 3/2011 | Lansdowne | H04J 3/0697 370/503 |
| 2012/0002558 | A1 | 1/2012 | Swartzentruber et al. | |
| 2012/0014377 | A1* | 1/2012 | Joergensen | H04L 43/106 370/352 |
| 2014/0280717 | A1* | 9/2014 | Frost | H04L 67/10 709/217 |

FOREIGN PATENT DOCUMENTS

| | | | |
|---|---|---|---|
| WO | 2010147473 A1 | 12/2010 | |
| WO | WO-2010147473 A1 * | 12/2010 | ........... H04L 63/105 |

OTHER PUBLICATIONS

Tal, "Zen and the Art of Network Timestamping", White Paper, Marvell Semiconductor, Inc., 5488 Marvell Lane, Santa Clara, CA 95054, USA, Feb. 2018.

"International Search Report and Written Opinion," PCT/US2018/048046, dated Nov. 29, 2018.

* cited by examiner

FIG. 1

*PRIOR ART*

INDIRECT PACKET CLASSIFICATION TIMESTAMPING SYSTEM AND METHOD

TECHNICAL FIELD

The present invention relates to the field of network clock synchronization and in particular to a system and method of timestamping data packets in a packet-switched communication network with indirect classification.

BACKGROUND OF THE INVENTION

In packet-switched communication networks, data packets are transmitted between different devices within the network. Although the devices are all part of a single network, each device has its own clock. Creating a common time base for the devices within the network improves the effectiveness of data transfer within the network. The common time base may be used, for example, to: trigger coordinated measurement instances in a network of sensors; coordinate actions of controllers in an industrial system; or synchronize radio nodes in a mobile communication network, i.e. a cellular network. In addition to sensors and controllers, the system may include computers and communication devices, such as routers. Several standard protocols have been developed for use in synchronizing clocks, for example, the Network Time Protocol (NTP) and the Precision Time Protocol (PTP) of IEEE 1588-2008, the entire contents of which are incorporated herein by reference. PTP describes sending timing related messages between nodes in a communication network. The timing-related messages include, for example, a node transmitting a time-stamped packet to supply its time base to another node and a node transmitting a packet requesting the receiving node to reply with the time of receipt. Any errors in handling the timing-related messages may be detrimental to accurate clock synchronization and the harm may be cumulative over multiple network devices. Furthermore, efficient handling of timing-related messages is beneficial so as to avoid interfering with other communication.

Figure 1:
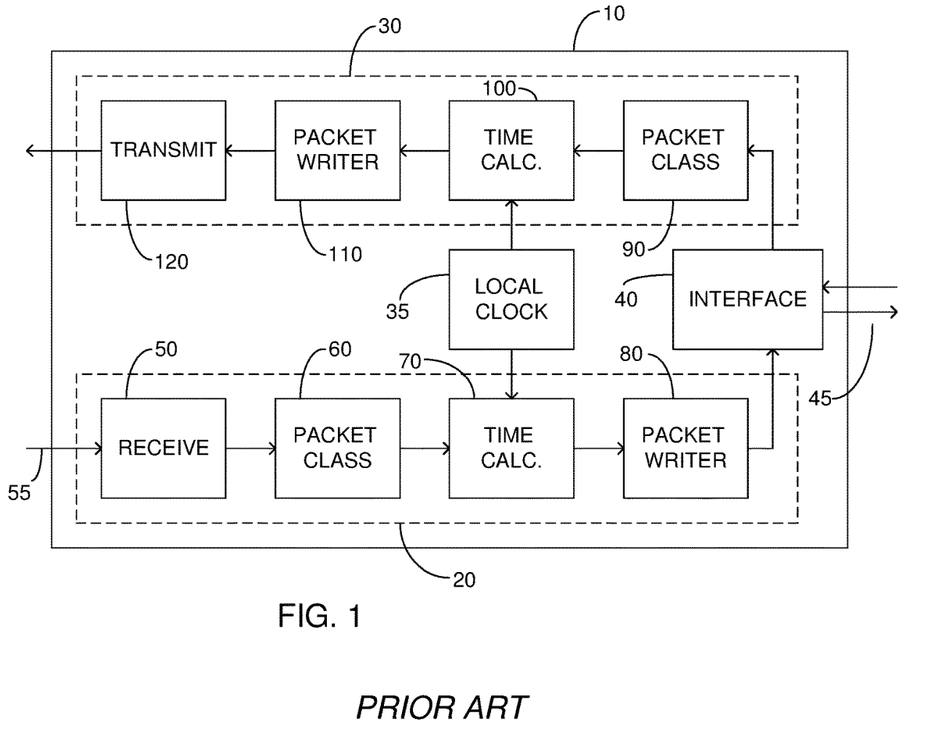
FIG. 1 illustrates a high level block diagram of a prior art PHY enabling timestamping packet classification.

U.S. Pat. No. 8,571,014, granted on Oct. 29, 2013 to Joergensen et al., the entire contents of which is incorporated herein by reference, describes a distributed packet-based timestamp engine, which classifies data packets for processing based on the packet type and performs specific timestamp operations based on the packet classification. FIG. 1 illustrates a high level block diagram of a prior art physical layer (PHY) enabling timestamping classification for data packets. PHY 10 comprises: a receive block 20 arranged to receive an input signal from a communication network (not shown); a transmit block 30 arranged to transmit an output signal to the communication network; a local clock 35 arranged to provide a timebase for PHY 10 and supply local time values to receive block 20 and transmit block 30; and an interface block 40 for coupling to higher-level devices (not shown). An output of receive block 20 is illustrated as being coupled to an input of interface block 40 and an input of transmit block 30 is illustrated as being coupled to an output of interface 40, however this is not meant to be limiting in any way. In another embodiment, various other processing and/or formatting blocks are included in the signal path between receive block 20 and interface block 40 and in the signal path between transmit block 30 and interface block 40.

Receive block 20 comprises: a receiver 50; a packet classifier 60; a time calculator 70; and a packet writer 80. Transmit block 30 comprises: a packet classifier 90; a time calculator 100; a packet writer 110; and a transmitter 120. Each of interface block 40, receiver 50, packet classifier 60, time calculator 70, packet writer 80, packet classifier 90, time calculator 100, packet writer 110 and transmitter 120 is generally implemented with electronic circuitry. For example, in one embodiment, PHY 10 is provided in a complementary metal-oxide-semiconductor (CMOS) integrated circuit. In another embodiment, software programming is used to control operation of some of the circuitry in PHY 10. In one embodiment, a programmable processor is used to configure the circuitry of PHY 10 and to handle exception conditions.

Local clock 35 provides time values which are synchronized to another clock in the communication network (not shown). In one embodiment, local clock 35 is a master clock for the communication network and is synchronized to a high accuracy clock such as the US Naval Observatory. In some embodiments, local clock 35 receives an input clock signal and a time value which are supplied by a time module (not shown). The time module may in various embodiments determine the time of day through its own clock, a signal received by PHY 10, or a combination of both. The input clock signal provides a reference frequency, for example, nominally 250 MHZ, that is locked to the frequency of a master clock in the communication network. In such an embodiment, the received time value is loaded into local clock 30 to initialize or update the local time value.

Receiver 50 is coupled to a communication link 55 in the communication network. In one embodiment, communication link 55 comprises a fiber optic cable or one or more twisted pair copper cables. Receiver 50 receives an input signal from communication link 55. In many embodiments, the input signal is received according to a standard format, for example, a standard for Ethernet. In one embodiment, receiver 50 comprises amplifiers, signal equalizers, phase locked loops and related circuitry, as known to those skilled in the art at the time of the invention. Receiver 50 processes the input signal to recover data therefrom and generates a data packet. A packet may also be termed a frame, depending, in part, on the format standard. In one embodiment, receiver 50 also determines a start of a packet or frame, for example, by determining that a frame delimiter signal or frame synchronization signal has been received.

Packet classifier 60 classifies each packet according to what type of timestamp action is to be performed. In one embodiment, the packets are classified to be one of types A through E. Type A packets are packets that are not to receive timestamp processing in receive block 20. Type B packets are packets that are to have the local time value of local clock 35 written into the packet. Type C packets are packets that are to have a timestamp in the received packet modified by subtracting the local time value of local clock 35 and adding a predetermined offset value, which in some embodiments may be zero. In another embodiment, the predetermined offset value is an indication of a delay of the communication link 55 on which receiver 50 receives data. In one embodiment, the predetermined offset value is instead, or in addition, an absolute value of an expected time of transversal of a start of the packet from the time of entry into receiver 50 to either: a time at which a start of the packet is determined by receiver 50; or a sampling time at which the local time value of local clock 35 is sampled, which may both be the same time. In another embodiment, the predetermined offset value can be negative.

Type D packets are packets that are to have a timestamp in the received packet modified by adding the local time value of local clock 35 and adding the offset value described above in relation to type C packets. In another embodiment, type D packets are packets which are to be transmitted by transmit block 30, i.e. type D packets are only classified by packet classifier 90, as will be described below. Type E packets are packets that are to be saved along with the local time value of local clock 35 on a memory (not shown). Type E packets can be subsequently processed, for example, by a network processor (not shown).

In one embodiment, packet classifier 60 classifies packets formatted according to multiple protocols, for example, Ethernet and multiprotocol label switching (MPLS) packets. In another embodiment, the classification of packet classifier 60 is based on one or both of a timestamp protocol for the packet, such as IEEE 1588-2008, and whether the packet is being received or transmitted. Particularly, as described above, in one embodiment, type C is a classification reserved for received packets and type D is a classification reserved for packets to be transmitted. In one embodiment, packets are additionally classified using a flow, timing domain, virtual local area network (VLAN), or other identifier.

Packets classified by packet classifier 60 are supplied to time calculator 70. Time calculator 70 generates a timestamp value responsive to the classification of the packet. As described above, for many packet classifications time calculator 70 uses the local time value obtained from local clock 35. In one embodiment, the local time value desired is the time when a specific part of the packet (for example, the end of an Ethernet start of frame delimiter (SFD)) arrives at the input of receiver 50. Accordingly, in one embodiment, the local time value used by time calculator 70 is a value from local clock 35 minus a delay value that compensates for delays between the input to receiver 50 and the time at which time calculator 70 receives a value from local clock 35. In another embodiment, the local time value from local clock 35 is retrieved by receiver 50 and supplied to time calculator 70 with the classified packet. In one non-limiting embodiment, delay values are calculated using a measured loopback delay. In an embodiment using the above described classifications, for type B and E packets, the new timestamp value generated is the local time value of local clock 35. For type C and D packets, time calculator reads a timestamp value included in the received packet and generates a new timestamp value, as described above. As further described above, for type C and D packets, time calculator 70 in one embodiment generates the new timestamp value responsive to a predetermined offset value. Particularly, in one embodiment, for type C packets, the new timestamp value generated is the received timestamp value minus the local time value of local clock 35 plus the predetermined offset value. For type A packets, time calculator 70 does not generate a new timestamp value.

The new timestamp value generated by time calculator 70 is provided to packet writer 80. Packet writer 80 writes the received timestamp value into a predetermined location of the data packet. In one embodiment, the predetermined location in the packet where the timestamp is written varies depending on the format of the packet. In another embodiment, the predetermined location where the timestamp is written is the same location where the previous timestamp is located. In one embodiment, the predetermined location is the location of an IEEE 1588-2008 packet correction field. In another embodiment, packet classifier 60 provides further classification indicating the location where the timestamp should be written, e.g. a location in a preamble of the packet, a reserved location in the packet, or appended to the end of the packet.

In one embodiment, packet writer 80 additionally clears a field in the packet depending on the format of the packet. For example, a checksum field in a user datagram protocol (UDP) packet is optionally cleared. Packet writer 80 additionally updates checksum-type values in the packet as appropriate for the format of the packet. For example, for an Ethernet format packet, packet writer 80 updates the frame check sequence (FCS). In one further embodiment, packet writer 80 additionally checks the FCS in the received packet. If the FCS is incorrect, packet writer 80 can discard the packet or provide an updated FCS that is corrupted, for example, by inversion, to prevent further processing of the packet.

In one embodiment, packet classifier 60, time calculator 70 and packet writer 80 operate on the received packet without storing the received packet in a memory. For example, concurrent with packet writer 80 writing a timestamp in a packet, receiver 50 receives a later portion of the packet, i.e. all the operations are concluded by the time receiver 50 finishes receiving the packet.

Interface block 40 receives the modified packet from packet writer 80. Interface block 40 provides an interface 45 to a higher-level component (not shown), such as a media access controller (MAC). A higher-level component that receives packets over the interface may perform further packet processing, for example, determining where to forward the packet. In one embodiment, the interface to a higher-level component is a gigabit media-independent interface (GMII). Interface block 40 transmits the modified packet over interface 45. Interface 45 is bidirectional and interface block 40 similarly receives packets for transmission over interface 45.

Packets received over interface 45 are supplied to transmit block 30 by interface block 40. In another embodiment, separate interface blocks 40 are provided for receiving and transmitting. Packet classifier 90 of transmit block 30 operates in a manner similar to, and optionally the same as, packet classifier 60. However, the classifications of packets can differ between packet classifiers 60 and 90. As described above, type C classifications are uniquely provided by packet classifier 60 and type D classifications are uniquely provided by packet classifier 90. Classified packets are provided to time calculator 100 that operates in a manner similar to time calculator 70. However, in one embodiment, timestamp values generated by time calculator 100 depend on the classification of the packet, which may differ from the classifications provided by packet classifier 60. For example, for a type D classification, time calculator 100 optionally provides a new timestamp value which is the received timestamp value plus the local time value of local clock 35 plus a predetermined offset value. In one embodiment, the predetermined offset value is a delay value that compensates for delays between the time at which time calculator 100 receives the local time value from local clock 35 and when a reference point in the packet will be transmitted by transmitter 120. As a result, the new timestamp indicates the time at which a predetermined portion of the packet exits transmitter 120.

In another embodiment, the local time value of local clock 35 is retrieved by transmitter 120 and supplied to time calculator 100 with the packet processed over blocks in a pipelined manner. The output timestamp value generated by time calculator 100 is provided to packet writer 110. Packet writer 110 writes the timestamp value output by time calculator 100 to a predetermined location in the packet, as described above in relation to packet writer 80.

Transmitter 120 processes the modified packet received from packet writer 110 to generate an output signal. Transmitter 120 is coupled to a communication link, for example, a fiber optic cable, in the communication network to transmit the generated output signal. In one embodiment, transmitter 120 transmits the generated output signal according to the same standard format as used by receiver 50 for receiving input signals.

PHY 10 thus provides timestamping as required by various protocols, such as: PTP; NTP; Service Activation Test (SAT); and Operations, Administration and Maintenance (OAM). Unfortunately, providing packet classification inside PHY 10 requires a PHY 10 which is more expensive, draws more power and has increased latency. In order to limit these disadvantages, a limited number of classifications is provided in the PHY, which is further disadvantageous.

SUMMARY OF THE INVENTION

Accordingly, it is a principal object of the present invention to overcome at least some of the disadvantages of the prior art. This is provided in one embodiment by a PHY exhibiting an egress side, the PHY further comprising: a clock arranged to generate a time signal indicative of the current time; and an egress stamp functionality arranged to: receive a data packet on the egress side, extract data from a predetermined section of the received data packet, and responsive to the extracted data, perform one of a plurality of predetermined timestamp operations, the plurality of predetermined timestamp operations comprising: generating a timestamp signal responsive to the generated time signal; not generating a timestamp signal; or modifying a timestamp written in the received data packet, wherein the extracted data comprises instructions indicating which of the plurality of predetermined timestamp operations to perform.

In one independent embodiment, a packet processor in communication with a PHY is provided, the packet processor comprising: a classifier; a stamp functionality; and a transmitter, wherein the classifier is arranged to: receive a data packet; and generate a classification for the received data packet in accordance with predetermined classification rules, the generated classification selected from a plurality of predetermined classifications, wherein the stamp functionality is arranged, responsive to the generated classification, to: generate a pointer, the pointer pointing to a predetermined location in a memory of the PHY; or generate instructions for timestamping operations, the generated instructions selected from at least three predetermined instruction options, and wherein the transmitter is arranged to transmit to an egress side of the PHY the received data packet along with the generated pointer or instructions.

In another independent embodiment, an indirect classification timestamping system is provided, the system comprising: at least one physical layer (PHY), each of the at least one PHY exhibiting an egress side; and at least one packet processor, each of the at least one PHY in communication with one of the at least one packet processor, wherein each of the at least one packet processor comprises: a classifier; a processor egress stamp functionality; and a first transmitter, wherein the classifier is arranged to: receive a data packet; and generate a classification for the received data packet in accordance with predetermined classification rules, the generated classification selected from a plurality of predetermined classifications, wherein the processor egress stamp functionality is arranged, responsive to the generated classification, to: generate a pointer; or generate instructions for timestamping operations, the generated instructions selected from at least three predetermined instruction options, wherein the first transmitter is arranged to transmit to the egress side of the PHY the received data packet along with the generated pointer or instructions, wherein each of the at least one PHY comprises: a PHY clock arranged to generate a first time signal indicative of the current time; and a PHY egress stamp functionality, wherein the PHY egress stamp functionality is arranged, responsive to the generated pointer or the generated instructions, to perform one of a plurality of predetermined timestamp operations, the plurality of predetermined timestamp operations comprising: generating a timestamp signal responsive to the generated time signal; not generating a timestamp signal; or modifying a timestamp written in the received data packet.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawing.

DETAILED DESCRIPTION OF PREFERRED EMBODIMENTS

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. In particular, the term "coupled" as used herein is not meant to be limited to a direct connection, and allows for intermediary devices or components without limitation.

Figure 2A:
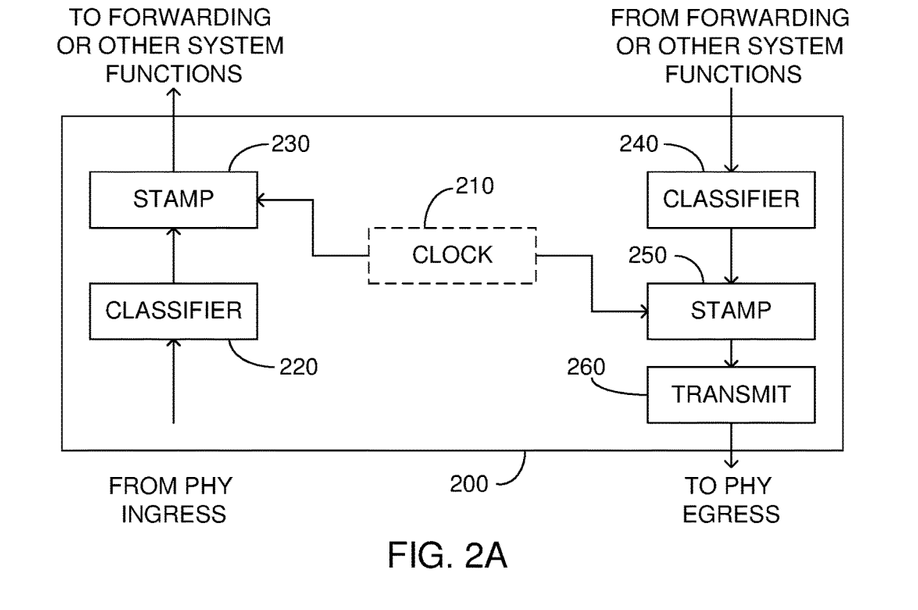
FIG. 2A illustrates a high level block diagram of a first packet processor in accordance with certain embodiments.
Figure 2B:
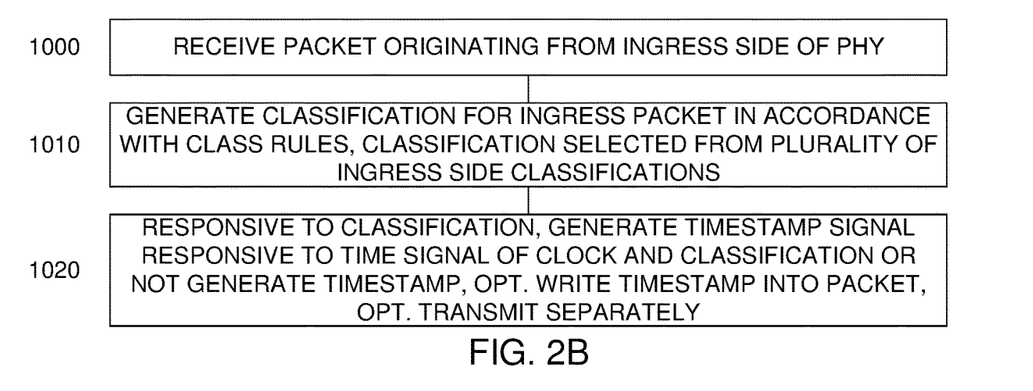
FIG. 2B illustrates a high level flow chart of a method of operation of an ingress side of the packet processor of FIG. 2A.
Figure 2C:
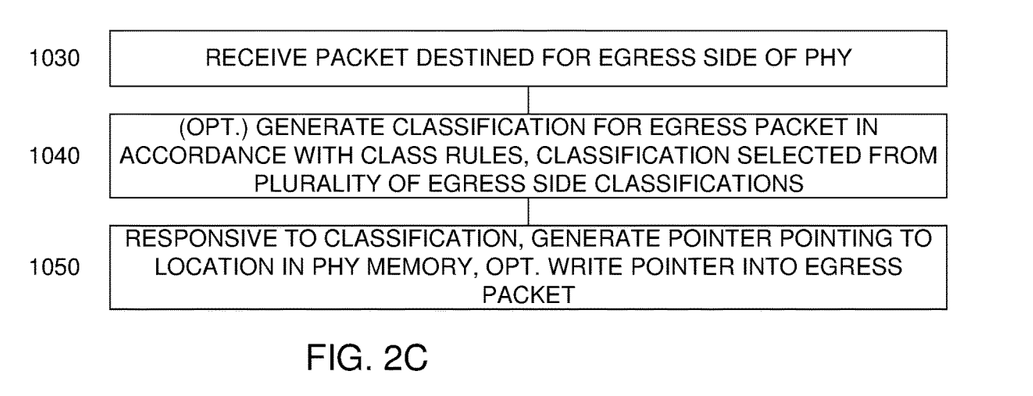
FIG. 2C illustrates a high level flow chart of a method of operation of an egress side of the packet processor of FIG. 2A.

FIG. 2A illustrates a high level block diagram of a packet processor 200, FIG. 2B illustrates a high level flow chart of a method of operation of an ingress side of packet processor 200 and FIG. 2C illustrates a method of operation of an egress side of packet processor 200, FIGS. 2A-2C being described together. As will be described below, packet processor 200 allows for a simplified PHY as compared to the prior art. Packet processor 200 comprises: an optional processor clock 210; an ingress side classifier 220; an ingress side timestamp functionality 230; an egress side classifier 240; an egress side timestamp functionality 250; and a transmitter 260. Each of optional processor clock 210, ingress side classifier 220, ingress side timestamp functionality 230, egress side classifier 240, egress side timestamp functionality 250 and transmitter 260 is generally implemented with electronic circuitry. In one embodiment, packet processor 200 is implemented as a CMOS integrated circuit. In another embodiment, packet processor 200 is implemented in a field programmable gate array (FPGA) circuitry. In yet another embodiment, packet processor 200 is implemented in an application specific integrated circuit (ASIC). Each of optional processor clock 210, ingress side classifier 220, ingress side timestamp functionality 230, egress side classifier 240, egress side timestamp functionality 250 and transmitter 260 being implemented by a dedicated portion of the circuit arranged to perform the steps described below in stages 1000-1050. In another embodiment, packet processor 200 is implemented within a network processor, with each of optional processor clock 210, ingress side classifier 220, ingress side timestamp functionality 230, egress side classifier 240, egress side timestamp functionality 250 and transmitter 260 being implemented by instructions stored on a memory of the processor, the processor arranged responsive to the stored instructions to perform the steps described below in stages 1000-1050.

An output of ingress side classifier 220 is in communication with a respective input of ingress side timestamp functionality 230. An output of egress side classifier 240 is in communication with a respective input of egress side timestamp functionality 250. A first output of optional processor clock 210 is in communication with a respective input of ingress side timestamp functionality 230 and a second output of optional processor clock 210 is in communication with a respective input of egress side timestamp functionality 250.

In operation, in stage 1000, ingress side classifier 220 receives a data packet originating from an ingress side of a PHY. As described above, a 'packet' may also be termed a 'frame', depending, in part, on the format standard. Thus, the term 'packet' is not meant to be limiting and is specifically meant to include frames. In one embodiment, as will be described below, prior to being received by ingress side classifier 220, the data packet is decoded by a dedicated decoding function.

In stage 1010, ingress side classifier 220 generates a classification for the received data packet of stage 1000 in accordance with predetermined classification rules, as described above in relation to packet classifier 60. The generated classification is selected from one of a plurality predetermined ingress side classifications. Each of the predetermined classifications indicates how the packet is to be time stamped. As described above, the different classifications indicate different options for which timestamp should be included in the packet, including the option of not providing a timestamp for the packet. Additionally, some of the classifications indicate how the packet should be further processed, such as a type E classification described above. In one non-limiting embodiment, as described above, the plurality of predetermined classifications comprises classification types A-E. In one embodiment, as will be described below, the generated classification is further stored, either inside the data packet or in a memory (not shown) along with a signature of the data packet. As will be described below, in such an embodiment the classification generated on the ingress side is later used on the egress side.

In stage 1020, responsive to particular classifications of the classification of stage 1010, ingress side timestamp functionality 230 generates a timestamp signal. In one embodiment, the timestamp signal is generated responsive to a time signal output by processor clock 210. Particularly, processor clock 210 is arranged to output time signals indicating the current time, as described above in relation to local clock 35. As described above, responsive to some of the predetermined classifications, the timestamp signal is a timestamp including the local time output by processor clock 210 minus a delay value which compensates for delays between receipt of the data packet at packet processor 200 and retrieval of the time signal from processor clock 210. In one embodiment, as will be described below, each data packet is timestamped by the PHY and the delay value is calculated responsive to the PHY generated timestamp and the known delay between receipt of the data packet at the PHY and the timestamping in the PHY, such that the timestamp generated by ingress side timestamp functionality 230 indicates the time at which the packet was received at the PHY. It is noted that generating a timestamp signal is particularly meant to include extracting a timestamp from the data packet of stage 1000. Thus, in one embodiment, for some classifications, timestamp functionality 230 extracts the timestamp from the data packet and does not generate a different timestamp. In another embodiment, for these classifications, timestamp functionality 230 leaves the timestamp in the data packet unmodified. In one embodiment, the generated timestamp signal is a pulse output by packet processor 200 when the data packet is output. The pulse is received by an external circuitry, which uses the pulse as a timestamp to determine the time of exit of the data packet from packet processor 200. Specifically, the external circuitry determines when the pulse was received, according to a local clock, thus determining, or approximating, the time of exit from packet processor 200.

In one embodiment, ingress side timestamp functionality 230 writes the generated timestamp into the data packet. As described above, in one embodiment, the timestamp is appended to the end of the packet. It is noted that writing the timestamp into the packet is meant to specifically include appending the timestamp to the end, or beginning of the packet. Additionally, writing the timestamp into the packet is meant to further specifically include amending the value of a timestamp already contained within the packet. Particularly, in one embodiment, ingress side timestamp functionality 230 adds or subtracts the timestamp supplied by the PHY to a value contained in another timestamp field within the packet.

In one embodiment, as described above, for some classifications of the packet, no timestamp is written into the packet. In the event that the packet has a timestamp supplied by the PHY, the timestamp is either discarded or ignored.

In another embodiment, ingress side timestamp functionality 230 further extracts a packet signature from the data packet. The timestamp is then transmitted separately along with the packet signature, as per two-step PTP operation, as known to those skilled in the art.

After ingress side timestamp functionality 230 generates the timestamp into the packet, and optionally writes the generated timestamp into the packet, the packet is then transmitted out of packet processor 200 into the network.

The above has been described in an embodiment where the timestamp is both generated and written into the data packet by ingress side timestamp functionality 230, however this is not meant to be limiting in any way. In another embodiment, each of the generation and writing of the timestamp is performed by a separate functionality, as described above in relation to PHY 10.

In stage 1030, egress side classifier 240 receives a data packet destined for an egress side of the PHY of stage 1000. The data packet is received from a device somewhere in the network and is destined for a system interface associated with the PHY of stage 1000.

In optional stage 1040, egress side classifier 240 generates a classification for the received data packet of stage 1030 in accordance with predetermined classification rules, as described above in relation to packet classifier 90. The generated classification is selected from one of a plurality predetermined egress side classifications. Each of the predetermined classifications indicates how the packet needs to be time stamped. As described above, the different classifications indicate different options for which timestamp should be included in the packet, including the option of not providing a timestamp for the packet. In one non-limiting embodiment, as described above, the plurality of predetermined classifications comprises classification types A-E. As described above, in one embodiment, some classifications are unique to egress side classifications, such as type D. Similarly, some classifications are unique to ingress side classification, such as type C. The above has been described in an embodiment where both an egress side classifier 240 and an ingress side classifier 220 are provided, however this is not meant to be limiting in any way. In another embodiment, a single classifier is provided, the single classifier arranged to perform classification of data packets on both the ingress side and the egress side. As described above, in one embodiment, classification is performed only on the ingress side and the classification is again used when the data packet arrives on the egress side. In such an embodiment, an egress side classifier 240 is not used.

In stage 1050, responsive to the generated classification of stage 1040, egress side timestamp functionality 250 generates one of: a pointer and timestamping instructions. Particularly, in one embodiment, timestamp functionality 250 generates a pointer which points to a predetermined portion of a memory of the PHY of stage 1000. The predetermined memory portion contains instructions which indicates to the PHY what timestamp to provide for the data packet or how to modify a timestamp already in the data packet, or alternatively, not to provide a timestamp for the data packets. The pointer is generated so as to point to the correct instructions in accordance with the generated classification. Thus, the PHY will be able to correctly timestamp the data packet in accordance with the generated classification. In an alternate embodiment, no pointer is provided when a timestamp is not necessary.

In another embodiment, egress side timestamp functionality 250, instead of generating a pointer which points to the timestamping instruction in a memory of the PHY, generates the instructions itself.

In one preferred embodiment, egress side rewriter further writes the generated pointer, or generated instructions, into a predetermined section of the data packet. In one embodiment, the generated pointer/instructions are written into a header of the data packet. In one further embodiment, the header is one of a VLAN tag type header and a USXGMII-PCH type header. It is noted that the generation and writing of the pointer/instructions are described herein as being accomplished by a single egress side timestamp functionality 250, however this is not meant to be limiting. In another embodiment, each of the generation and writing into the data packet is performed by a separate functionality.

In one embodiment, egress side timestamp functionality 250 further generates a timestamp responsive to the time signal of local clock 210, i.e. generates a timestamp indicating the current time of day. Egress side timestamp functionality 250 the writes the timestamp into the data packet, as described above. In such an embodiment, the PHY can modify the packet's timestamp, for example by adding to the timestamp the transmission time through the PHY.

The packet, with the pointer/instructions, is then transmitted to the PHY by transmitter 260. In one embodiment, as will be described below, prior to being transmitted to the PHY, the data packet is encoded by a dedicated encoding function. Optionally, the encoding function is implemented within transmitter 260.

It is noted that stages 1030-1050 of FIG. 2C are not dependent on stages 1000-1020 of FIG. 2B. Particularly, the steps performed on the ingress side can be different and this will not have an effect on the steps performed on the egress side. In one embodiment, classification may be performed only on the egress side and no timestamp operations are performed on the ingress side. In another embodiment, timestamp operations are performed on the ingress side, however they are performed with a different method.

Figure 2D:
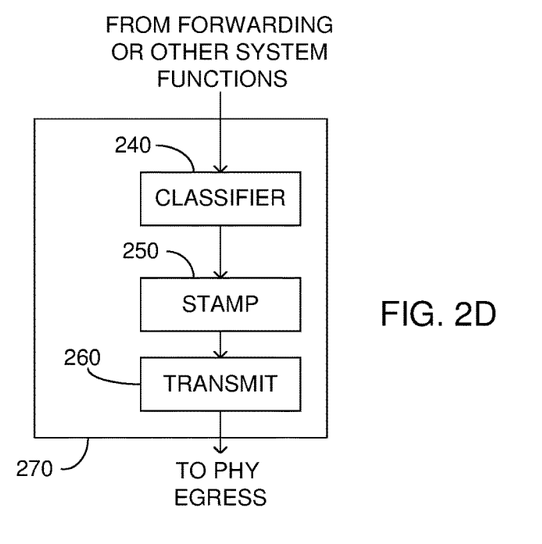
FIG. 2D illustrates a high level block diagram of an egress side of a second packet processor in accordance with certain embodiments.

FIG. 2D illustrates a high level block diagram of an egress side of a packet processor 270. Packet processor 270 comprises: an egress side classifier 240; an egress side timestamp functionality 250; and a transmitter 260. The operation of packet processor 270 is in all respects similar to the operation of the egress side of packet processor 200. Optional local clock 210 is not shown for simplicity. As described above, in one embodiment, egress side classifier 240 is not provided and a classifier is provided only on the ingress side.

As described above in relation to packet processor 200, in one embodiment, packet processor 270 is implemented as a CMOS integrated circuit. In another embodiment, packet processor 270 is implemented in an FPGA circuitry. In yet another embodiment, packet processor 270 is implemented in an ASIC. Each of egress side classifier 240, egress side timestamp functionality 250 and transmitter 260 are implemented by a dedicated portion of the circuit arranged to perform the steps described above in stages 1030-1050. In another embodiment, packet processor 200 is implemented within a network processor, with each of egress side classifier 240, egress side timestamp functionality 250 and transmitter 260 being implemented by instructions stored on a memory of the processor, the processor arranged responsive to the stored instructions to perform the steps described above in stages 1030-1050.

Figure 3A:
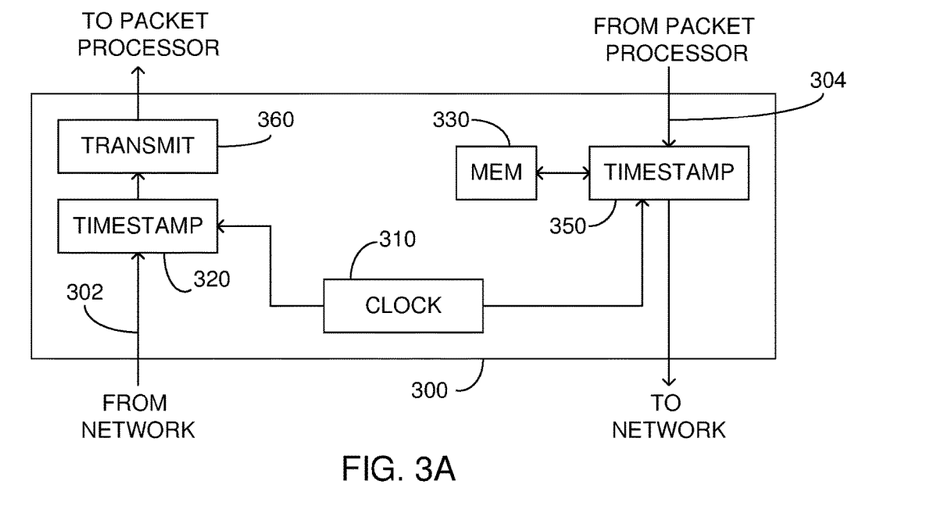
FIG. 3A illustrates a high level block diagram of a first PHY in accordance with certain embodiments.
Figure 3B:
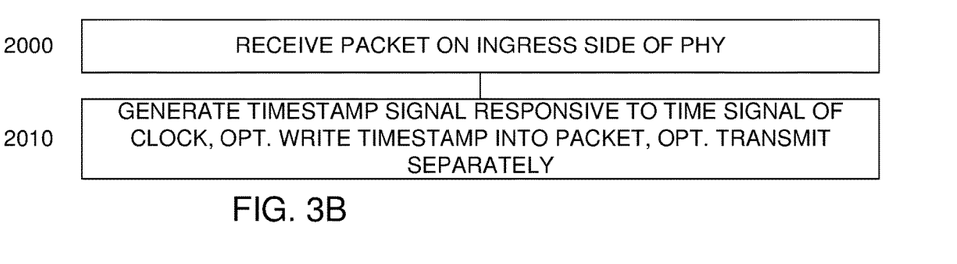
FIG. 3B illustrates a high level flow chart of a method of operation of an ingress side of the PHY of FIG. 3A.
Figure 3C:
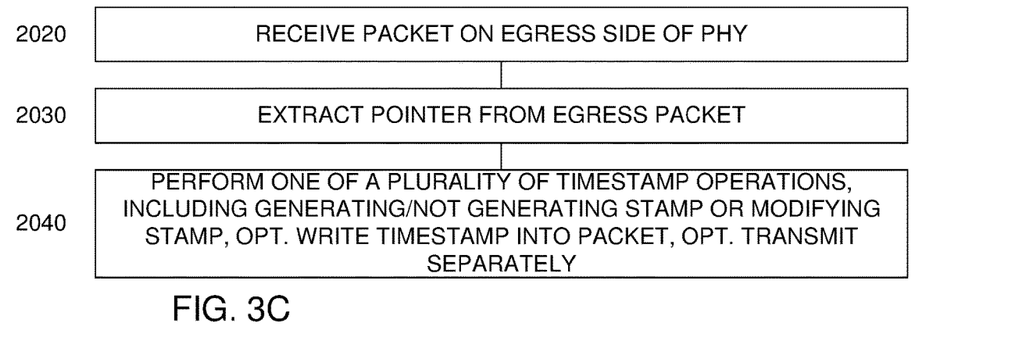
FIG. 3C illustrates a high level flow chart of a method of operation of an egress side of the PHY of FIG. 3A.

FIG. 3A illustrates a high level block diagram of a PHY 300, FIG. 3B illustrates a high level flow chart of a method of operation of an ingress side of PHY 300 and FIG. 3C illustrates a high level flow char of a method of operation of an egress side of PHY 300, FIGS. 3A-3C being described together. PHY 300 exhibits an ingress side 302 and an egress side 304. PHY 300 further comprises: a PHY clock 310; an ingress side timestamp functionality 320; a memory 330; an egress side timestamp functionality 350; and a transmitter 360. Each of PHY clock 310, ingress side timestamp functionality 320, memory 330, egress side timestamp functionality 350 and transmitter 360 is generally implemented with electronic circuitry. In one embodiment, PHY 300 is implemented as a CMOS integrated circuit. In another embodiment, PHY 300 is implemented as an FPGA circuitry or an ASIC. Each of PHY clock 310, ingress side timestamp functionality 320, egress side timestamp functionality 350 and transmitter 360 are implemented by a dedicated portion of the circuit arranged to perform the steps described below in stages 2000-2040. Ingress side timestamp functionality 320 is located within ingress side 302. Egress side timestamp functionality 350 is located within egress side 304.

In operation, in stage 2000, a data packet is received on ingress side 302 at ingress side timestamp functionality 320. In one embodiment, as will be described below, prior to being received by ingress side timestamp functionality 320, the data packet is decoded by a dedicated decoder. In stage 2010, ingress side timestamp functionality 320 generates a timestamp signal for the data packet responsive to a time signal output by PHY clock 310. Particularly, PHY clock 310 is arranged to output time signals indicating the current time, as described above in relation to local clock 35. In one embodiment, the generated timestamp signal is a timestamp including the current time as indicated by the output time signal of PHY clock 310. In another embodiment, as described above, the generated timestamp includes a time value equal to the output time signal of PHY clock 310 and an offset value equal to the time difference between the receipt of the data packet by PHY 300 and the sampling of the time signal of PHY clock 310. As described above, in one embodiment, timestamp functionality 320 generates a pulse which is received by a packet processor. The packet processor notes the time of receipt of the pulse and thereby determines the time of transmission of the data packet from PHY 300.

In one embodiment, ingress side timestamp functionality 320 writes the timestamp into a predetermined section of the data packet, as described above, and the data packet is then transmitted out of the PHY to a packet processor, such as packet processor 200 described above, by transmitter 360. In one further embodiment, prior to transmission out of the PHY, the data packet is encoded by a dedicated encoding function. Optionally, the encoding function is implemented within transmitter 360. In another embodiment, the generation and writing of the timestamp are performed by separate functionalities. In an alternate embodiment, as will be described below, the timestamp is not written into the data packet and is separately transmitted out of the PHY to the packet processor.

In stage 2020, a data packet is received on egress side 304 of PHY 300 from the packet processor, at egress side timestamp functionality 350. In one embodiment, prior to being received by egress side timestamp functionality 350, the data packet is decoded by a dedicated decoder. In stage 2030, egress side timestamp functionality extracts a pointer from the received egress side data packet. As described above, the extracted pointer points to a portion of memory 330. In one embodiment, the header containing the pointer is additionally removed from the data packet. In another embodiment, the pointer extraction is performed by a separate functionality (not shown).

In stage 2040, responsive to the extracted pointer, egress side timestamp functionality 350 retrieves instructions from the portion of memory 330 pointed to by the extracted pointer. Responsive to the retrieved instructions, egress side timestamp functionality 350 performs one of a plurality of predetermined timestamp operations. Particularly, the retrieved instructions indicate what type of timestamp to generate, in accordance with the classification of the data packet, as described above. The plurality of predetermined timestamp operations to be chosen from comprise at least: generating a timestamp signal responsive to the generated time signal of PHY clock 310; not generating a timestamp signal; and modifying a timestamp which is already written in the received data packet. Modifying the timestamp includes, in one embodiment, extracting the timestamp from the data packet for modification. In another embodiment, predetermined bits of the timestamp are adjusted within the data packet.

As described above, for some classifications, the timestamp value is equal to the time signal of PHY clock 310 offset by a predetermined offset value. In another embodiment, the value of the time signal of PHY clock 310 is added to the value of a timestamp in the data packet, the outcome of the addition being the new timestamp. In one embodiment, egress side timestamp functionality 350 further writes the timestamp into the data packet, as described above. In another embodiment, the timestamp is output separately from PHY 300, as will be described below. As described above, in one embodiment, the generated timestamp signal is a pulse which is detected by an external circuitry. The data packet, with the optionally written timestamp, is then output from PHY 300 to the associated system interface.

It is noted that the egress side operations of stages 2020-2040 are not dependent on the ingress side operations of stage 2000-2010. Particularly, the steps performed on the ingress side can be different and this will not have an effect on the steps performed on the egress side. In one embodiment, no timestamping is performed on the ingress side, the timestamping only performed in the packet processor. In another embodiment, timestamping is performed on the ingress side, however they are performed with a different method.

Figure 3D:
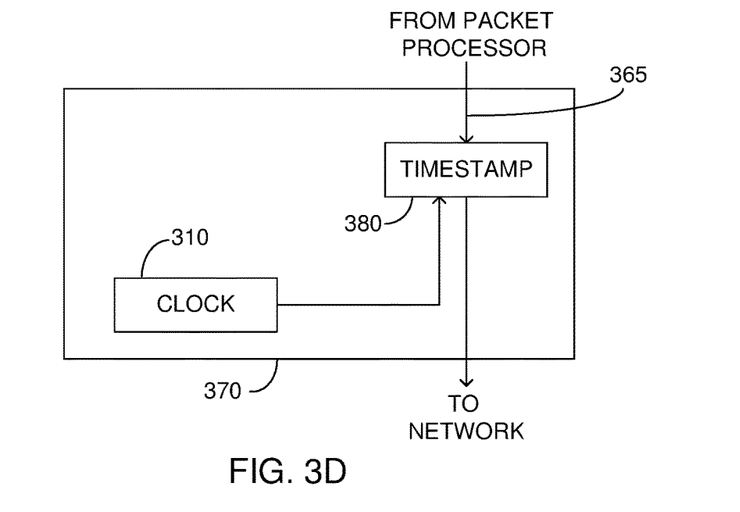
FIG. 3D illustrates a high level block diagram of an egress side of a second PHY in accordance with certain embodiments.
Figure 3E:
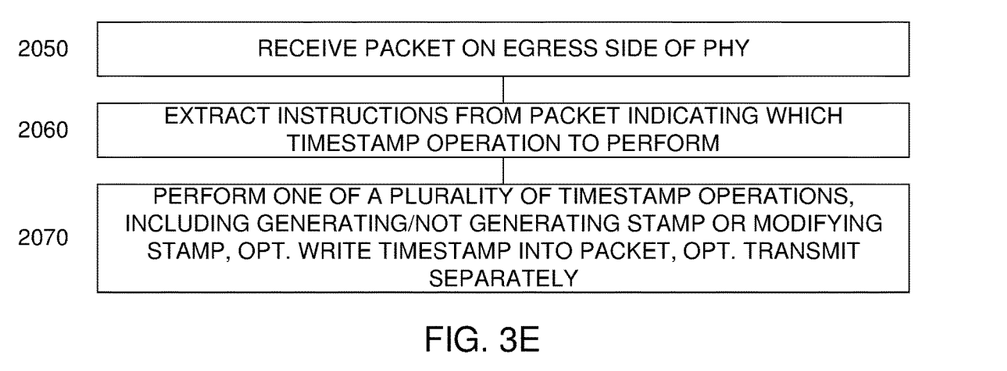
FIG. 3E illustrates a high level block diagram of a method of operation of an egress side of the PHY of FIG. 3D.

FIG. 3D illustrates a high level block diagram of an egress side 365 of a PHY 370, comprising PHY local clock 310 and a timestamp functionality 380. FIG. 3E illustrates a high level flow chart of a method of operation of egress side 365 of PHY 370, FIGS. 3D-3E being described together. Although only egress side 365 of PHY 370 is illustrated and described herein, this is not meant to be limiting in any way and an egress side of PHY 370 (not shown) is also provided. As described above, the operations on egress side 365 are not dependent on operations performed on the ingress side.

As described above in relation to PHY 300, PHY local clock 310 and timestamp functionality 380 are each generally implemented with electronic circuitry. In one embodiment, PHY 370 is implemented as a CMOS integrated circuit. In another embodiment, PHY 370 is implemented as an FPGA circuitry or an ASIC. Each of PHY clock 310 and timestamp functionality 380 is implemented by a dedicated portion of the circuit arranged to perform the steps described below in stages 2050-2070.

In operation, in stage 2050, a data packet is received on egress side 365 at timestamp functionality 380. In one embodiment, as described below, prior to receipt at timestamp functionality 380 the data packet is decoded by a dedicated decoder. In stage 2060 timestamp functionality 380 extracts instructions written in the received data packet of stage 2050. In one embodiment, the extraction is performed by a separate functionality (not shown). As described above, the instructions instruct timestamp functionality 380 which timestamp operations to perform.

In stage 2070, as described above in relation to stage 2040, timestamp functionality 380 performs one of a plurality of timestamp operations. The plurality of predetermined timestamp operations to be chosen from comprise at least: generating a timestamp signal responsive to the generated time signal of PHY clock 310; not generating a timestamp signal; and modifying a timestamp which is already written in the received data packet. The operation of timestamp functionality 380 is similar to the operation of timestamp functionality 350 with the exception that the instructions are extracted from the data packet rather than from a memory.

Figure 4:
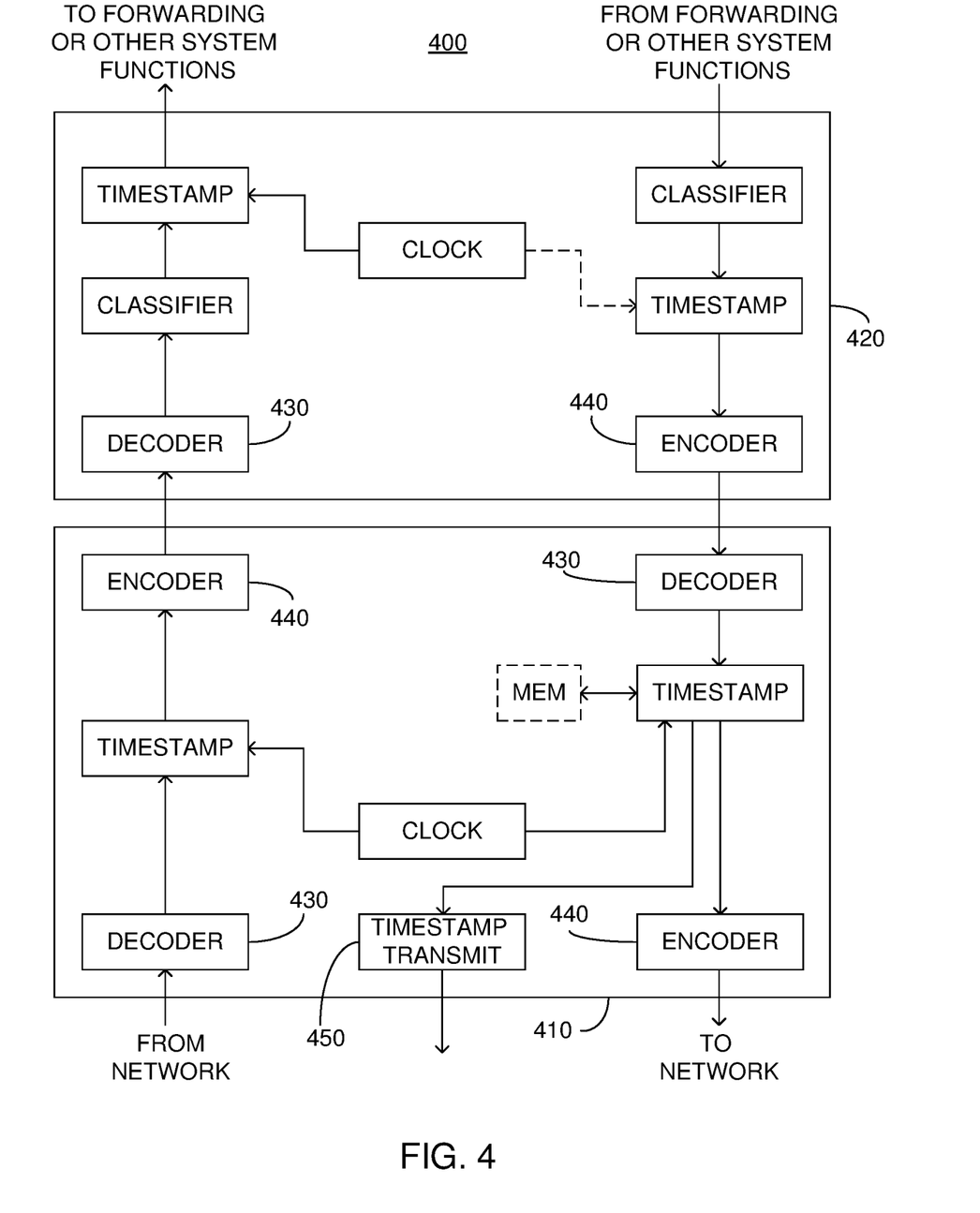
FIG. 4 illustrates a high level block diagram of a partial system comprising the packet processor of FIG. 2A and the PHY of FIG. 3A.

FIG. 4 illustrates a high level block diagram of an indirect classification timestamping system 400. Indirect classification timestamping system 400 comprises: a PHY 410; and a packet processor 420. The configuration of PHY 410 is in all respects similar to the configuration of PHY 300, or PHY 370, described above, with the exception that a pair of decoders 430, a pair of encoders 440 and a timestamp transmitter 450 are provided. Each decoder 430 comprises a physical coding sublayer (PCS) decoding function and a physical medium attachment (PMA) decoding function, as defined by the IEEE 802.3 standard. Each encoder 440 comprises a PCS encoding function and a PMA encoding function, as defined by the IEEE 802.3 standard. The configuration of packet processor 420 is in all respects similar to the configuration of packet processor 200 described above, with the exception that a decoder 430 and an encoder 440 are provided.

The operation of data communication system 400 is in all respect similar to the operation of packet processor 200 and PHY 300, as described above. Particularly, as described above, each ingress data packet is decoded by a respective decoder 430 when being received at PHY 410 and encoded by a respective encoder 440 when exiting PHY 410. The encoded ingress data packet is then decoded upon arrival at packet processor 420 by decoder 430. Similarly, each egress data packet is encoded by encoder 440 prior to exiting packet processor 420. The encoded egress data packet is then decoded upon arrival at PHY 410 by a respective decoder 430 and again encoded by a respective encoder 440 when exiting PHY 410. As further described above, in one embodiment, the timestamp generated for the egress data packet is output separately from PHY 410 by timestamp transmitter 450. Alternately, in an embodiment where the timestamp signal comprises a pulse, the pulse is optionally output by timestamp transmitter 450. Although a timestamp transmitter 450 is illustrated only on the egress side of PHY 410, this is not meant to be limiting in any way. In another embodiment, timestamp transmitters are supplied at the ingress and/or egress side of each of PHY 410 and packet processor 420. In yet another embodiment, timestamps are transmitted in serial with the transmitted data packets, along the same data communication path.

Thus, PHY 410 provides egress side timestamping based on classification performed in packet processor 420. Advantageously, standard packet processors already provide packet classification, therefore packet processor 420 does not add cost or power consumption over existing packet processors.

Figure 5A:
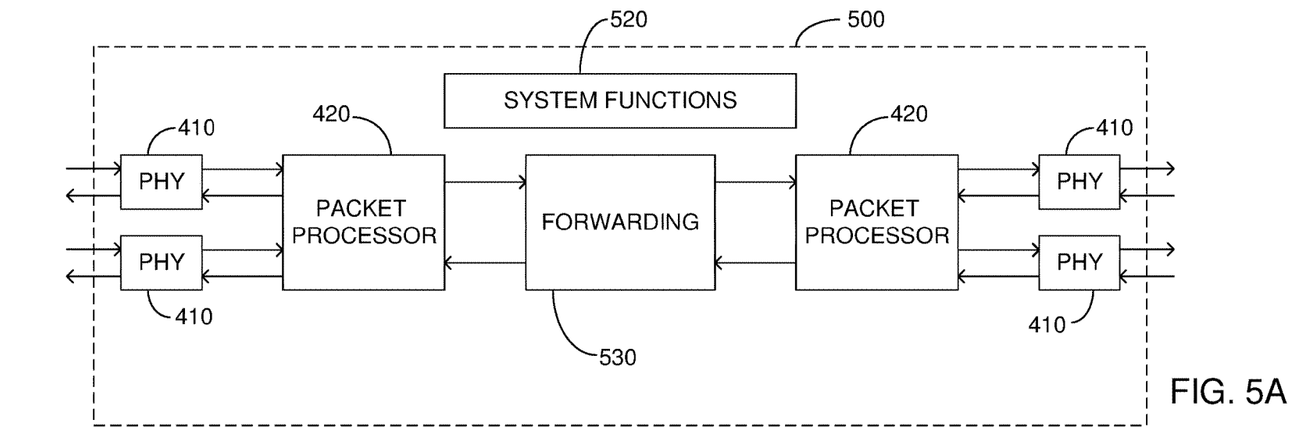
FIG. 5A illustrates a high level block diagram of a first embodiment of a data switch or hub equipment.

FIG. 5A illustrates a high level block diagram of an indirect classification timestamping system 500. Indirect classification timestamping system 500 comprises: a plurality of PHYs 410; a pair of packet processors 420; a system functionality 520; and a forwarding functionality 530. Each packet processor 420 is in communication with a respective set of PHYs 410. In another embodiment (not shown), only a single packet processor 420 is provided, the single packet processor in communication with each of PHYs 410. Packet processors 420 are further in communication with each other via forwarding functionality 530. As described above, data packets are transmitted from each PHY 410 to the associated packet processor 420 and from each packet processor 420 to the associated PHY 410. Forwarding functionality 530 transmits data packets through data switch 500, responsive to system functionality 520, as known to those skilled in the art. Indirect classification timestamping system 500 is implemented, in one non-limiting embodiment, as an Ethernet switch, hub equipment, an internet protocol (IP) router, an MPLS switch or router, an optical transmission system, or a wireless transmission system. Indirect classification timestamping system 500 can further be implemented in a cellular base station, a radio system, or any computer server requiring synchronization from a network.

Figure 5B:
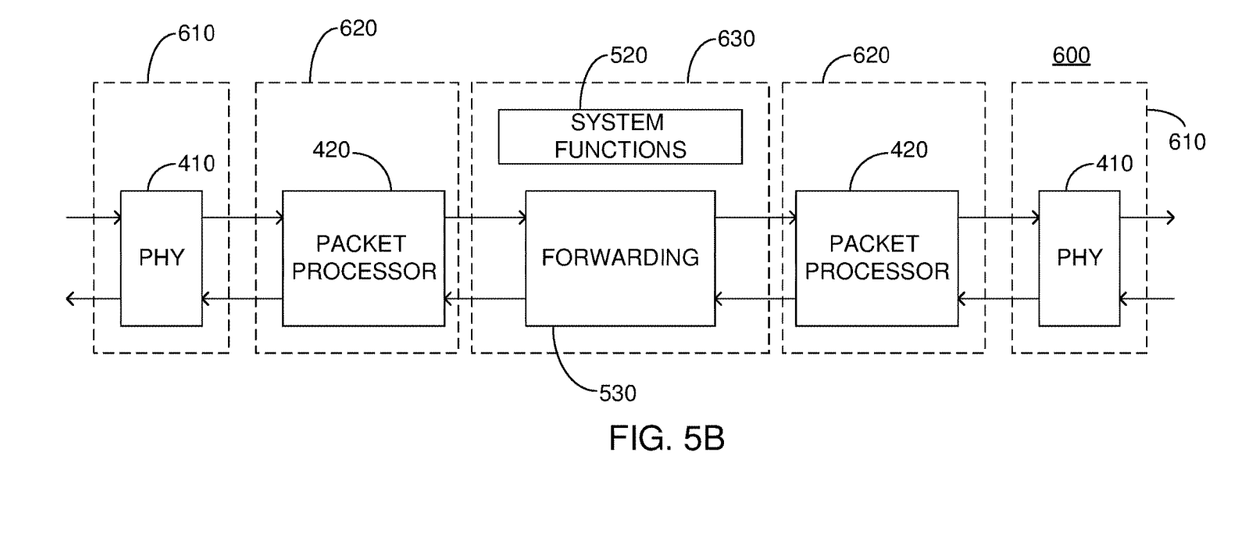
FIG. 5B illustrates a high level block diagram of a second embodiment of a data switch or hub equipment.

FIG. 5B illustrates a high level block diagram of an indirect classification timestamping system 600 comprising: a pair of interface cards 610, each interface card 610 comprising one or more PHYs 410; a pair of packet processing cards 620, each packet processing card 620 comprising a packet processor 420; and a system card 630, system card 630 comprising a system functionality 520 and a forwarding functionality 530. As described above, in one embodiment, each packet processor 420 is in communication with a plurality of PHYs 410. As described above, each PHY 410 is arranged to transmit and receive data packets to and from an associated packet processor 420 and data packets are transmitted between packet processors 420 by system functionality 520 and forwarding functionality 530. Using separate interface cards 610, packet processing cards 620 and system cards 630 allows for greater flexibility in system construction. As described above in relation to indirect classification timestamping system 500, indirect classification timestamping system 600 is implemented, in one non-limiting embodiment, as an Ethernet switch, hub equipment, an internet protocol (IP) router, an MPLS switch or router, an optical transmission system, or a wireless transmission system. Indirect classification timestamping system 600 can further be implemented in a cellular base station, a radio system, or any computer server requiring synchronization from a network.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described herein above. Rather the scope of the present invention is defined by the appended claims and includes both combinations and sub-combinations of the various features described hereinabove as well as variations and modifications thereof which would occur to persons skilled in the art upon reading the foregoing description and which are not in the prior art.

The invention claimed is:

1. An indirect classification timestamping system, comprising:
   at least one physical layer (PHY), each of said at least one PHY exhibiting an egress side; and
   at least one packet processor, each of said at least one PHY in communication with one of said at least one packet processor,
   wherein each of said at least one packet processor comprises:
      a classifier;
      a processor egress stamp functionality; and
      a first transmitter,
   wherein said classifier is arranged to:
      receive a data packet; and
      generate a classification for said received data packet in accordance with predetermined classification rules, said generated classification selected from a plurality of predetermined classifications,
   wherein said processor egress stamp functionality is arranged, responsive to said generated classification, to:
      generate a pointer; or
      generate instructions for timestamping operations, said generated instructions selected from at least three predetermined instruction options,
   wherein said first transmitter is arranged to transmit to said egress side of said PHY said received data packet along with said generated pointer or instructions,
   wherein each of said at least one PHY comprises:
      a PHY clock arranged to generate a first time signal indicative of the current time; and
      a PHY egress stamp functionality,
   wherein said PHY egress stamp functionality is arranged, responsive to said generated pointer or said generated instructions, to perform one of a plurality of predetermined timestamp operations, said plurality of predetermined timestamp operations comprising: generating a timestamp signal responsive to said generated time signal; not generating a timestamp signal; or modifying a timestamp written in said received data packet.

2. The system of claim 1, wherein said processor ingress egress stamp functionality is arranged to generate said instructions, said generated instructions indicating which of said plurality of predetermined timestamp operations to perform.

3. The system of claim 1, wherein each of said at least one PHY further comprises a memory,
   wherein said processor egress stamp functionality is arranged to generate said pointer, said pointer pointing to a portion of said memory, said portion of said memory comprising instructions indicating which of said plurality of predetermined timestamp operations to perform.

4. The system of claim 1, wherein for said arrangement of said processor egress stamp functionality to generate said pointer, said processor egress stamp functionality is further arranged, prior to said transmission to said PHY egress side, to write said generated pointer into said egress side data packet, said PHY egress stamp functionality further arranged to extract said written pointer from said egress side data packet, and
   wherein for said arrangement of said processor ingress stamp functionality to generate said instructions, said processor ingress stamp functionality is further arranged, prior to said transmission to said PHY egress side, to write said generated instructions into said egress side data packet, said PHY egress stamp functionality further arranged to extract said written instructions from said egress side data packet.

5. The system of claim 1, wherein each of said at least one PHY further exhibits an ingress side and further comprises:
   a PHY ingress stamp functionality; and
   a second transmitter,
   wherein said PHY ingress stamp functionality is arranged to:
      receive a data packet on said ingress side; and
      generate a predetermined ingress timestamp signal for said received ingress side data packet responsive to said generated time signal, said predetermined ingress timestamp signal generated for all data packets received on said ingress side,
   wherein said second transmitter is arranged to transmit said ingress side data packet, along with said generated ingress timestamp signal, to said packet processor in communication therewith.

6. The system of claim 5, wherein, prior to said transmission, said PHY ingress stamp functionality is further arranged to write said generated ingress timestamp signal into said ingress side data packet.

7. The system of claim 1, wherein said at least one packet processor comprises a plurality of packet processors and said at least one PHY comprises a plurality of PHYs, a first set of said plurality of PHYs in communication with a first of said plurality of packet processors and a second set of said plurality of PHYs in communication with a second of said plurality of packet processors.

8. The system of claim 1, wherein said at least one packet processor comprises a single packet processor and said at least one PHY comprises a plurality of PHYs, said plurality of PHYs in communication with said single packet processor.

9. An indirect packet classification timestamping method, the method comprising:
   receiving a data packet at an ingress side of one of a plurality of physical layers (PHYs);
   coupling the data packet to a packet processor;
   generating, at the packet processor, a classification for the received data packet in accordance with predetermined classification rules, said generated classification selected from a plurality of predetermined classifications;

generating, at the packet processor, a pointer indicating one of a plurality of predetermined instruction options;

writing said pointer into said received data packet;

transmitting said received data packet to an egress side of one of the plurality of PHYs;

extracting said pointer at said egress side;

generating a time signal indicative of the current time;

responsive to said extracted pointer, performing one of a plurality of predetermined timestamp operations, wherein said plurality of predetermined timestamp operations include generating a timestamp signal responsive to said generated time signal, not generating a timestamp signal or modifying a timestamp written in said received data packet, and wherein said extracted pointer points to a predetermined location in a memory that indicates which of said plurality of predetermined timestamp operations to perform.

10. A system that includes a system card, the system comprising:

a plurality of interface cards, each of the interface cards including at least one physical layer (PHY), the at least one PHY including a memory, a clock arranged to generate a time signal indicative of the current time and an egress stamp functionality; and a packet processing card coupled to the system card and to the plurality of interface cards, the packet processing card including a packet processor that includes:

a classifier arranged generate a classification for a received data packet in accordance with predetermined classification rules, said generated classification selected from a plurality of predetermined classifications, and a stamp functionality arranged, responsive to said generated classification, to generate instructions for timestamping operations selected from at least three predetermined instruction options, or to generate a pointer pointing to a predetermined location in a memory of the PHY indicating one of the predetermined instruction options, and a transmitter arranged to transmit said received data packet, along with said pointer or said instructions, to an egress side of the PHY, wherein the egress side of the PHY is arranged, upon receiving the data packet along with said pointer or said instructions, to:

extract data from a predetermined section of said received data packet to identify said generated pointer or said generated instructions, when the extracted data includes said pointer, identify using said memory, one of said at least three predetermined instruction options corresponding to said pointer, and perform one of a plurality of predetermined timestamp operations, said plurality of predetermined timestamp operations comprising: generating a timestamp signal responsive to said generated time signal; not generating a timestamp signal; or modifying a timestamp written in said received data packet, the performed timestamp operation corresponding to said pointer or said instructions.

* * * * *

UNITED STATES PATENT AND TRADEMARK OFFICE
CERTIFICATE OF CORRECTION

PATENT NO. : 10,887,211 B2
APPLICATION NO. : 16/109898
DATED : January 5, 2021
INVENTOR(S) : Brian Branscomb et al.

It is certified that error appears in the above-identified patent and that said Letters Patent is hereby corrected as shown below:

In the Claims

Column 15 Claim 2, Line 1 delete "ingress".

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*